(12) United States Patent
Gorosin et al.

(10) Patent No.: US 10,400,499 B2
(45) Date of Patent: Sep. 3, 2019

(54) LIFTING DEVICE FOR VEHICLE TAILGATE AND DRIVING DEVICE THEREOF

(71) Applicant: JOHNSON ELECTRIC INTERNATIONAL AG, Murten (CH)

(72) Inventors: Dennis Francis Gorosin, Hong Kong (CN); Xue Song Li, Shenzhen (CN); Man Ino Cheong, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 6 days.

(21) Appl. No.: 15/713,208

(22) Filed: Sep. 22, 2017

(65) Prior Publication Data

US 2018/0283076 A1    Oct. 4, 2018

(30) Foreign Application Priority Data

Mar. 28, 2017 (CN) .......................... 2017 1 0193638

(51) Int. Cl.
| | |
|---|---|
| *F16H 1/28* | (2006.01) |
| *E05F 15/622* | (2015.01) |
| *F16H 1/46* | (2006.01) |
| *F16H 25/20* | (2006.01) |
| *H02K 1/18* | (2006.01) |
| *H02K 5/04* | (2006.01) |
| *H02K 5/15* | (2006.01) |
| *H02K 7/116* | (2006.01) |

(52) U.S. Cl.
CPC ............. *E05F 15/622* (2015.01); *F16H 1/28* (2013.01); *F16H 1/46* (2013.01); *F16H 25/20* (2013.01); *H02K 1/185* (2013.01); *H02K 5/04* (2013.01); *H02K 5/15* (2013.01); *H02K 7/116* (2013.01); *E05Y 2201/434* (2013.01); *E05Y 2900/546* (2013.01); *F16H 2025/2075* (2013.01); *F16H 2025/2087* (2013.01); *H02K 2205/00* (2013.01); *H02K 2207/00* (2013.01); *H02K 2207/03* (2013.01)

(58) Field of Classification Search
CPC ... E05F 15/622; H02K 1/185; H02K 2207/00; H02K 2207/03; H02K 7/116; H02K 5/04; H02K 5/15; H02K 2205/00; F16H 1/28; F16H 1/46; F16H 2025/2075; F16H 2025/2087; F16H 2205/00; F16H 25/20; E05Y 2900/546; E05Y 2201/434
See application file for complete search history.

(56) References Cited

U.S. PATENT DOCUMENTS 10,141,813 B2 * 11/2018 Cheong .................... H02K 1/22
2010/0162839 A1 * 7/2010 Reif ........................ F16D 7/021
74/89.38

(Continued)

*Primary Examiner* — Mark J Beauchaine
(74) *Attorney, Agent, or Firm* — Muncy, Geissler, Olds & Lowe, P.C.

(57) ABSTRACT

A driving device includes an electric motor including a stator and a rotor rotatable relative to the stator, and a gear train connected to the rotor. The stator includes a cylindrical housing and an endcap mounted to an end of the housing; The gear train includes a gear mechanism with at least one stage, which includes a ring gear, a sun gear, planetary gears and a carrier. The ring gear is directly engaged with the endcap, which limits the position of the planetary gears of the gear train in an axial direction of the gear train.

17 Claims, 7 Drawing Sheets

(56) References Cited

U.S. PATENT DOCUMENTS

| | | | | |
|---|---|---|---|---|
| 2012/0032541 A1* | 2/2012 | Chen | ..................... | H02K 7/116 |
| | | | | 310/83 |
| 2013/0020854 A1* | 1/2013 | Park | ..................... | F16D 1/101 |
| | | | | 301/6.5 |
| 2013/0269305 A1* | 10/2013 | Wang | ..................... | A01D 34/00 |
| | | | | 56/14.7 |
| 2017/0023114 A1* | 1/2017 | Wang | ..................... | B60K 1/00 |
| 2018/0216390 A1* | 8/2018 | Takizawa | ..................... | B60J 5/10 |

* cited by examiner

LIFTING DEVICE FOR VEHICLE TAILGATE AND DRIVING DEVICE THEREOF

CROSS REFERENCE TO RELATED APPLICATIONS

This non-provisional patent application claims priority under 35 U.S.C. § 119(a) from Patent Application No. 201710193638.5 filed in The People's Republic of China on Mar. 28, 2017.

FIELD OF THE INVENTION

The present invention relates to driving devices, and in particular to an electric driving device and a vehicle tailgate lifting device using the electric driving device.

BACKGROUND OF THE INVENTION

Electric driving devices have been widely used in various fields. For example, in the automotive field, the electric driving devices are widely used to drive windows, door locks, tailgates and so on. The driving device of the lifting device for an automobile tailgate includes an electric motor and a gear reduction mechanism. Traditionally, the electric motor is connected with the gear reduction mechanism by an additional mounting flange. The electric motor is connected with the flange by screws. The gear reduction mechanism is fixed to the flange. However, the use of flanges undoubtedly increases the material cost and assembly cost of the lifting drive.

SUMMARY OF THE INVENTION

Thus, there is a desire to provide a low cost lifting device for vehicle tailgate.

In one aspect, the present invention provides a driving device which includes an electric motor including a stator and a rotor rotatable relative to the stator, and a gear train connector to the rotor. The stator including a cylindrical housing and an endcap mounted to an end of the housing. The gear train includes a gear mechanism with at least one stage, which includes a ring gear, a sun gear, planetary gears and a carrier. The ring gear is directly engaged with the endcap, which limits the position of the planetary gears of the gear train in an axial direction of the gear train.

Preferably, the ring gear is fastened to the endcap via locking pins, screws, interlocking structures or welding.

Preferably, the locking pin is formed by rolling a metal sheet.

Preferably, the housing defining an opening in the end thereof, the endcap covers the opening of the housing.

Preferably, the endcap extends into the housing via the opening, a plurality of protrusions forms at a circumferential surface of the endcap, the protrusions abuts against an inner surface of the housing of the stator.

Preferably, the housing of the stator is formed by rolling a metal sheet into a hollow column configuration.

Preferably, the endcap defines locking slots, and the housing of the stator forms locking parts respectively engaged in corresponding locking slots.

Preferably, one of the endcap and the housing of the electric motor forms positioning notches and the other forms positioning projections respectively received in corresponding positioning notches.

Preferably, a plurality of permanent magnets is mounted at an inner surface of the housing and a joining area between two edges of the metal sheet faces a gap formed between adjacent two of the magnets.

Preferably, the gear train includes an output member which has a hollow configuration with teeth or keys formed at an inner surface thereof.

Preferably, the output member is connected with the carrier of the planetary gear mechanism.

Preferably, the driving device further includes a retainer connected with the ring gear of the at least one stage planetary gear mechanism, wherein the output member is rotatably received in the retainer.

Preferably, a locking ring is arranged at a distal end of the output member, the locking ring abutting against an end face of the retainer.

Preferably, the retainer is integrally formed with the ring gear.

Preferably, the planetary gear mechanism includes a first stage planetary gear mechanism and a second stage planetary gear mechanism driven by the first stage planetary gear mechanism.

Preferably, the ring gear of the first stage planetary gear mechanism is received in the ring gear of the second stage planetary gear mechanism.

In another aspect, the present invention further provides a lifting device for a vehicle tailgate movably mounted to a vehicle body, including a first sleeve, a first interface member fixed to at one end of the first sleeve and connected to the vehicle body, a second sleeve coaxially connected to first sleeve, a second interface member located at one end of the second sleeve away from the first interface member and connecting to the vehicle tailgate, and a driving device described above installed in the first sleeve and configure to drive the second interface member to move related to the first interface member.

In the embodiment of the invention, the first endcap of the motor is directly connected with the ring gear of the gear train, and a flange which is usually used in traditional driving devices is omitted. Thus, the material cost and assembling cost are reduced.

BRIEF DESCRIPTION OF THE DRAWINGS

The present invention will be further described below with reference to the accompanying drawings and the following embodiments. It should be noted that the figures are illustrative rather than limiting the scope of the invention.

DETAILED DESCRIPTION OF THE PREFERRED EMBODIMENTS

Below, embodiments of the present invention will be described in greater detail with reference to the drawings.

Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

Figure 1:
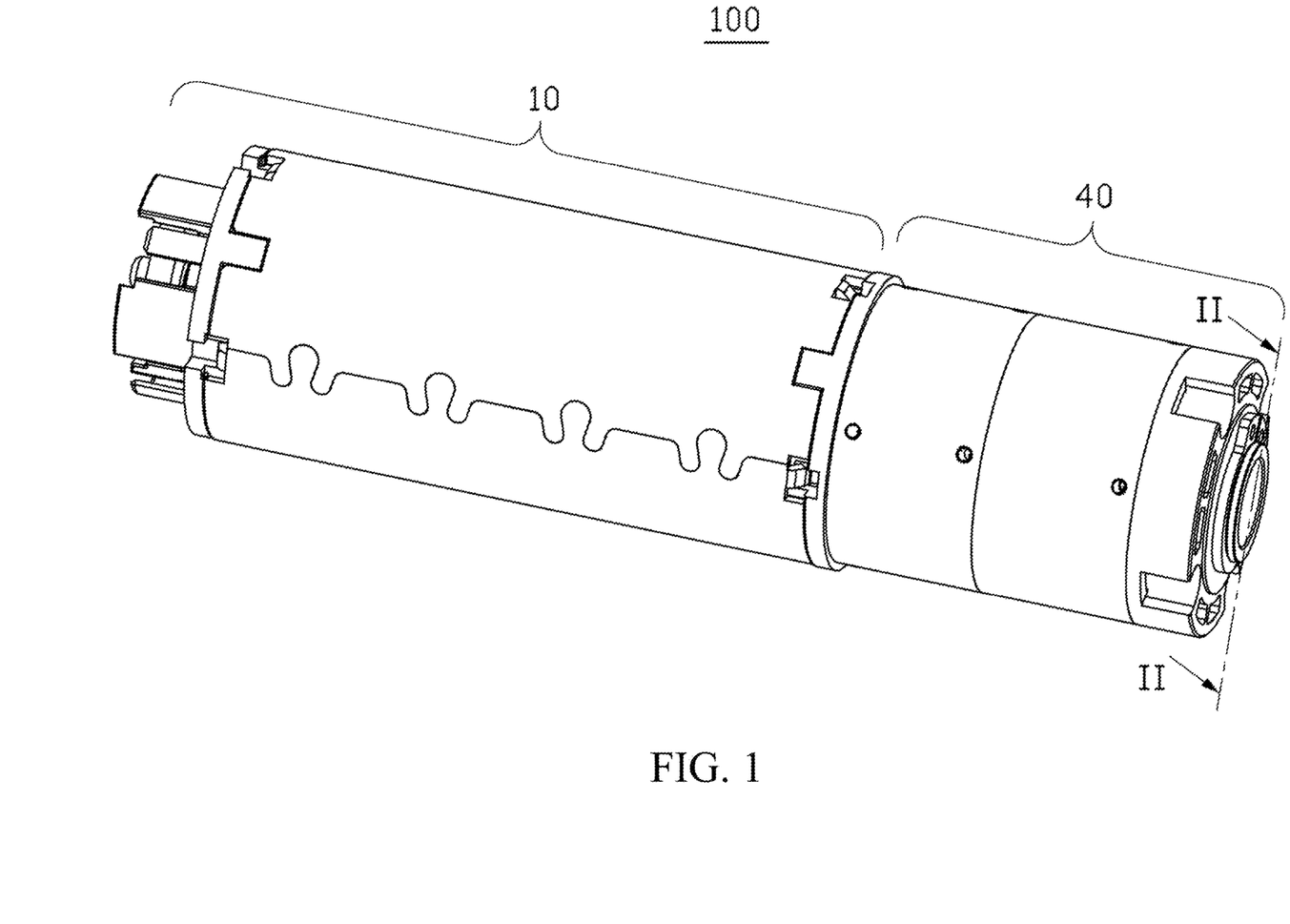
FIG. 1 is a perspective view of a driving device according to one embodiment of the present invention.
Figure 2:
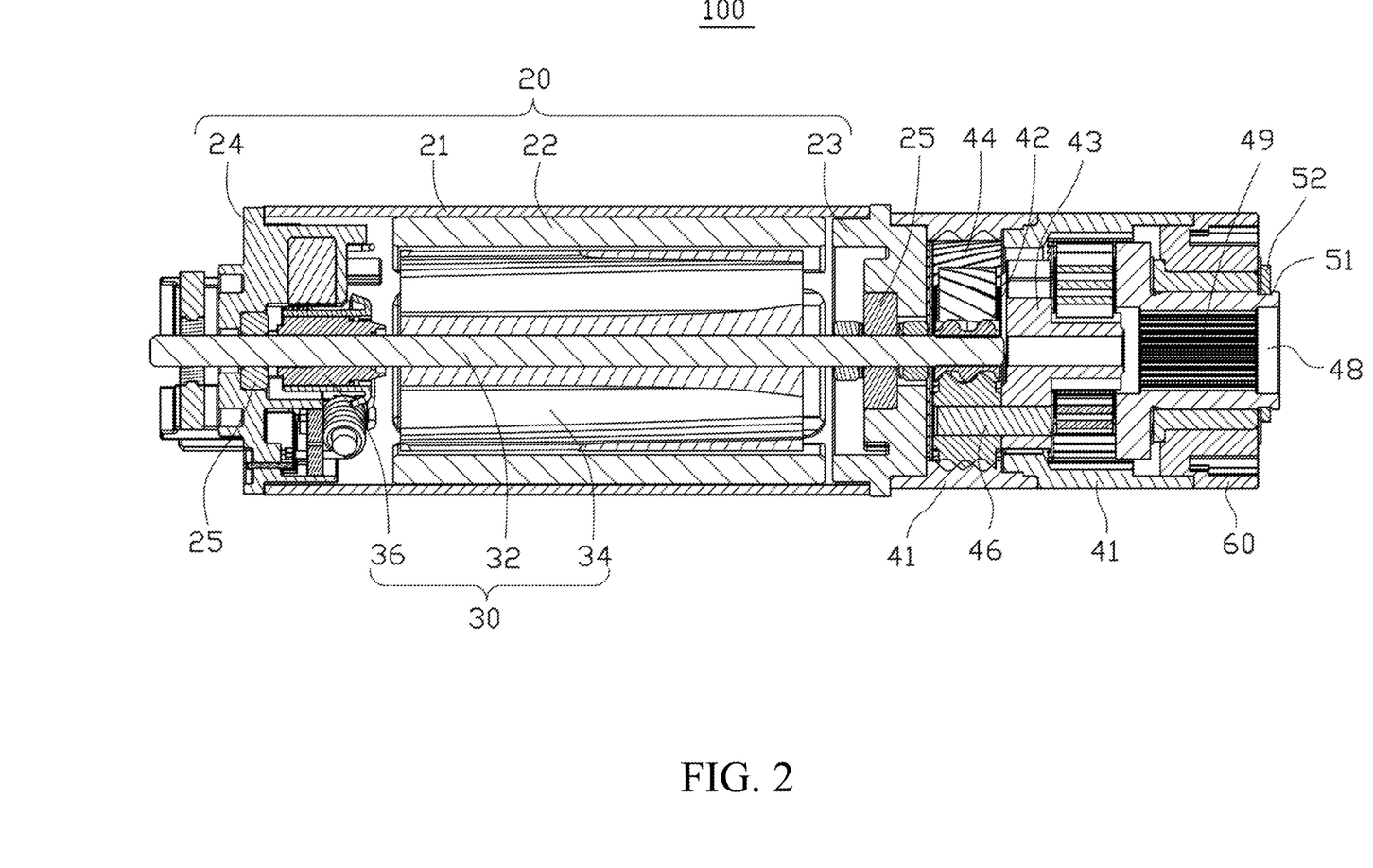
FIG. 2 is a cross section view of the driving device of FIG. 1.
Figure 3:
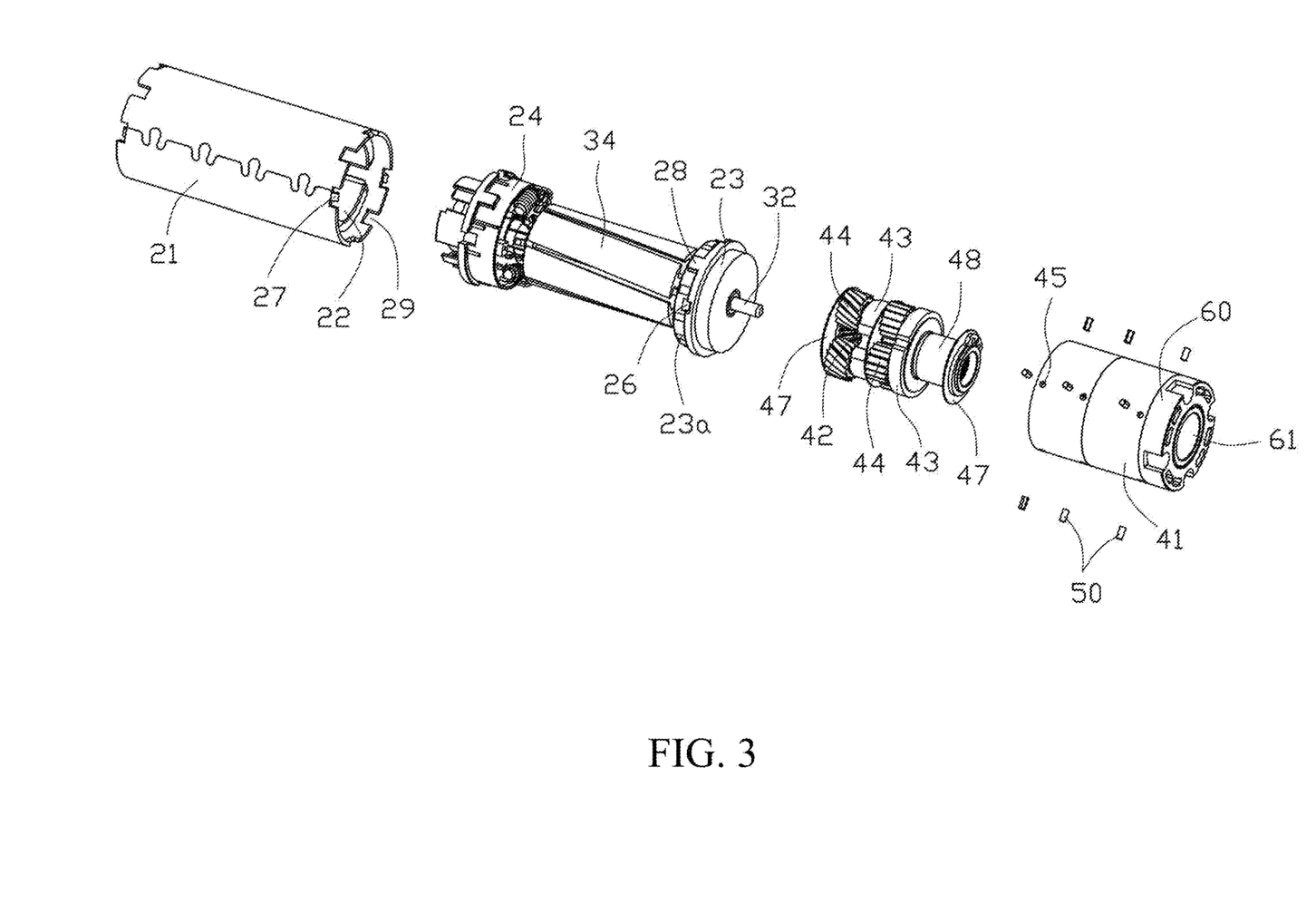
FIG. 3 is an exploded view of the driving device of FIG. 1.

Referring to FIG. 1 to FIG. 3, a driving device 100 of an electric lifting device for a vehicle tailgate in accordance with an embodiment of the present invention includes an electric motor 10 and a gear train 40. The electric motor 10 includes a stator 20 and a rotor 30.

The rotor 30 comprises a rotating shaft 32, a rotor core 34 and a commutator 36 fixed on the rotating shaft 32. A winding (not shown) is wound on the rotor core 34 and electrically connected with the commutator 36.

In the present embodiment, the stator 20 includes a housing 21, one or more permanent magnets 22 disposed on the inner surface of the housing 21, and a first endcap 23 and a second endcap 24 respectively fixed to opposite ends of the housing 21. In the present embodiment, the housing 21 is formed by rolling a metal sheet into a hollow column configuration. Preferably, the housing 21 has a hollow cylindrical configuration. Two opposite axial ends of the housing 21 form openings respectively. The first and second endcaps 23 and 24 respectively cover the two open ends of the housing 21 to thereby form a receiving space together with the housing 21. The rotor 30 is rotatably accommodated within the receiving space. The first endcap 23 and the second endcap 24 are respectively provided with a bearing 25 for rotatably supporting the rotating shaft 32 of the rotor 30 so that the rotor 30 can rotate relative to the stator 20. The second endcap 24 is further provided with brushes for slidingly contacting with the commutator 36 of the rotor 30.

Preferably, one open end of the housing 21 is fixed to the first endcap 23 by crimping. Specifically, the outer circumferential surface of the first endcap 23 forms a plurality of locking slots 26. The end of the housing 21 forms a plurality of locking parts such as locking fingers 27. After the first endcap 23 is mounted to the open end of the housing 21, the locking fingers 27 are deformed inwardly to be engaged in the corresponding locking slots 26. Thus, the first endcap 23 is fastened to the housing 21. Understandably, the first endcap 23 may be fixed to the housing by other suitable fastening methods.

Preferably, the first endcap 23 further forms a plurality of positioning projections 28 at the outer circumferential surface thereof. The housing 21 is formed with a positioning notch 29 corresponding to each positioning projection 28. The positioning projections 28 are engaged in the corresponding positioning notches 29 to thereby position the first endcap 23 in the circumferential direction.

Preferably, the first endcap 23 is further formed with a plurality of protrusions 23a at the outer circumferential surface thereof. When the first endcap 23 is inserted into the opening end of the housing 21, the protrusions 23a abut against the inner surface of the housing 21.

The gear train 40 is connected to the output end of the motor 10. In the present embodiment, the gear train 40 is a gear reduction mechanism and includes a two-stage planetary gear mechanism. Each stage planetary gear mechanism comprises a ring gear 41 with internal teeth formed at the inner surface thereof, a sun gear 42, a planetary gear carrier 43, and planetary gears 44 rotatably mounted to the carrier 43. The sun gear 42, the carrier 43, and the planetary gears 44 are received in the ring gear 41. The planetary gears 44 are meshed with the sun gear 42 and the ring gear 41.

Specifically, the gear ring 41 of the first stage planetary gear mechanism is fixedly connected with the first endcap 23 of the motor 10. Preferably, an end of the ring gear 41 and the first endcap 23 are connected together by one being inserted into the other in the axial direction. Thus, the first endcap 23 is overlapped with the end of the ring gear 41 in the radial direction. Positioning holes 45 are formed at the overlapped area between the first endcap 23 and the end of the ring gear 41. Locking pins 50 are respectively inserted into the positioning holes 45 to thereby fix the first endcap 23 and the ring gear 31 together. In the present embodiment, the end of the gear ring 41 surrounds the first endcap 23, and the locking pins 50 are inserted into the positioning holes 45 of the gear ring 41 and the positioning holes of the first endcap 23 in the radial direction. In the present embodiment, the locking pin 50 is hollow cylindrical-shaped and is formed by rolling a metal sheet. The locking pin 50 is easy to deform elastically when subjected to a radial force. Thus, the locking pin 50 is easily to be inserted into the positioning holes. In other alternative embodiments, the first endcap 23 may be connected to the ring gear 41 by means of screws, interlocking structures, or welding.

The sun gear 42 of the first planetary gear mechanism is fixed on the rotating shaft 32 of the motor 10 and rotates synchronously with the rotating shaft 32 of the motor 10. The carrier 43 is rotatably accommodated in the ring gear 41. The planetary gears 44 are rotatably mounted to the carrier 43 via rods 46. The planetary gears 44 are meshed with the sun gear 42 and the ring gear 41. When the sun gear 42 rotates, the planetary gears 44 rotates around the rods 46 and also revolve around the sun gear 42 in the ring gear 41 to thereby drive the carrier 43 to rotate.

The first endcap 23 of the motor 10 is capable of limiting the position of the planetary gears of the first stage planetary gear mechanism in the axial direction. Preferably, a gasket 47 is disposed between the first endcap 23 of the first motor 10 and the planetary gears 44, for reducing friction between the planetary gears 44 and the first endcap 23.

The carrier 43 of the first planetary gear mechanism is connected with the sun gear 42 of the second stage planetary gear mechanism. The connection can be an integral connection made by integrally forming the carrier 43 and the sun gear 42, or can be mutually fixed together after the carrier 43 and the sun gear 42 being separately formed. The output member 48 of the gear train 40 is formed by the axial end of the carrier 43 of the second stage planetary gear mechanism. In the present embodiment, the output member 48 is an approximate hollow cylinder and internal teeth or keys 49 are formed on the inner surface of the output member 48. In other embodiments, the output member may be a gear with external teeth. Preferably, a gasket 47 is disposed between the carrier 43 and the planetary gears 44 for reducing friction between the planetary gears 44 and the carrier 43.

Preferably, the driving device 100 further includes a retainer 60 for maintaining the output member 48 of the gear train 40 in a fixed position and preventing the output member 48 from swinging. The retainer 60 is fixedly connected with the ring gear 41 of the second stage planetary gear mechanism. A bearing 61 is mounted inside of the retainer 60 for rotatably supporting the output member 48 so that the output member 48 is rotatable within the retainer 60. The output member 48 passes through the bearing 61 and extends out of the retainer 60. Preferably, the distal end of the output member 48 is formed with an annular groove 51.

A locking ring 52 is engaged in the groove 51. The locking ring 52 abuts against the axial end face of the retainer 60 so as to position the output member 48 in an axial direction. Preferably, a gasket 47 is arranged between the locking ring 52 and the axial end face of the retainer 60 for reducing friction there between.

Preferably, the ring gear 41 of the second planetary gear mechanism and the ring gear 41 of the first planetary gear mechanism are connected together via one of the ring gears 41 being partly inserted into the other of the ring gears 41 in the axial direction of the ring gears 41 and locking pins 50 being inserted into the overlapped parts of the ring gears 41. The ring gear 41 of the second planetary gear mechanism and the retainer 60 may be connected together with the same way.

In the embodiment of the invention, the first endcap 23 of the motor 10 is directly connected with the ring gear 41 of the gear train 40, and a flange which is usually used in traditional driving devices is omitted. Thus, the material cost and assembling cost are reduced. In addition, in traditional driving devices, the end of the motor housing is connected to the flange through screws and the motor housing is usually formed by deep drawing the cost of which is relatively high. In the embodiment of the invention, the housing 21 of the motor is formed by rolling a metal sheet the cost of which is much low. Preferably, the joining area between two edges of the metal sheet forming the housing corresponds to the gap formed between two adjacent magnets to avoid glue which is used to adhere the magnets to the housing to escape from the joining area of the housing.

Figure 4:
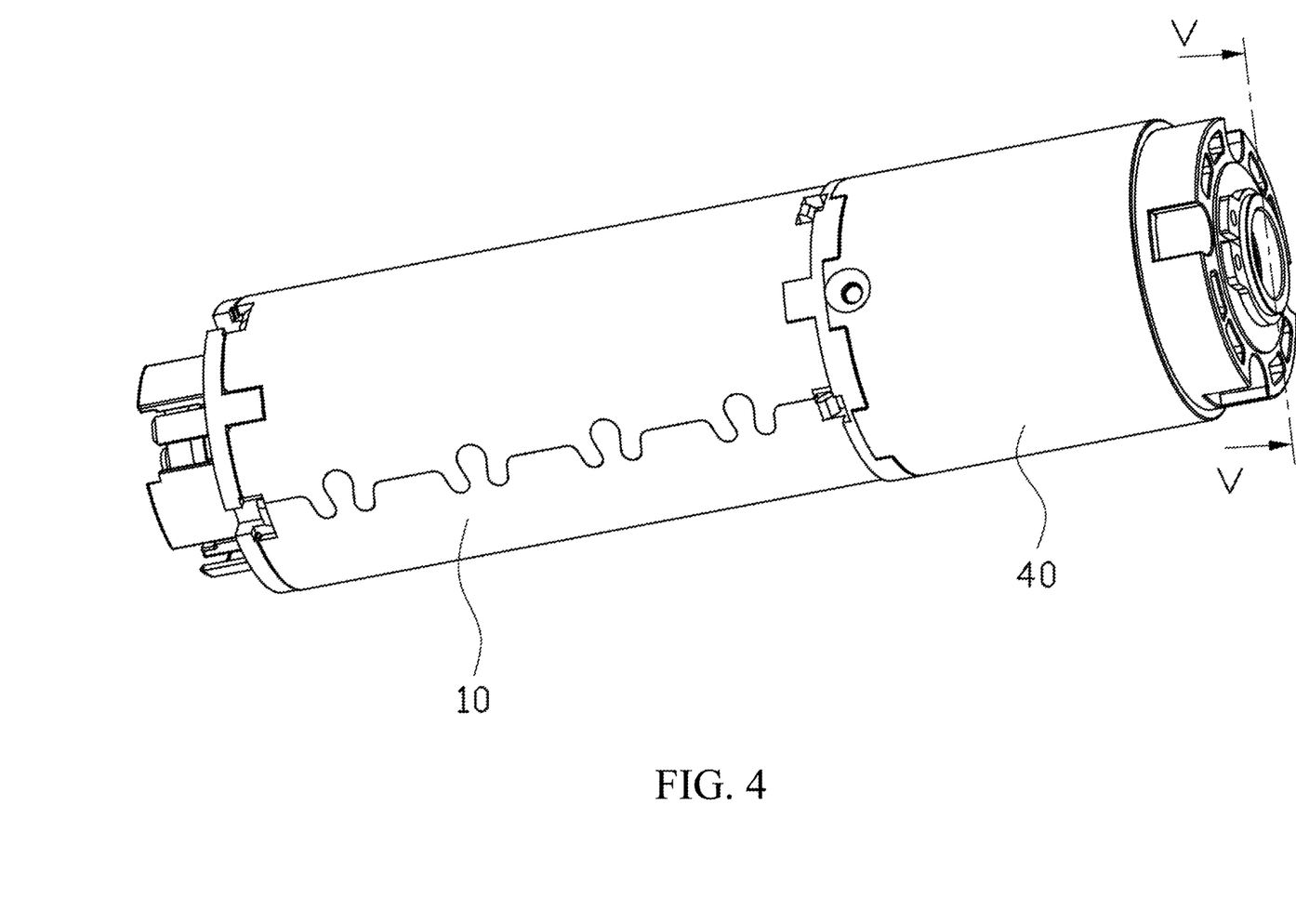
FIG. 4 is a perspective view of a driving device according to a second embodiment of the present invention.
Figure 5:
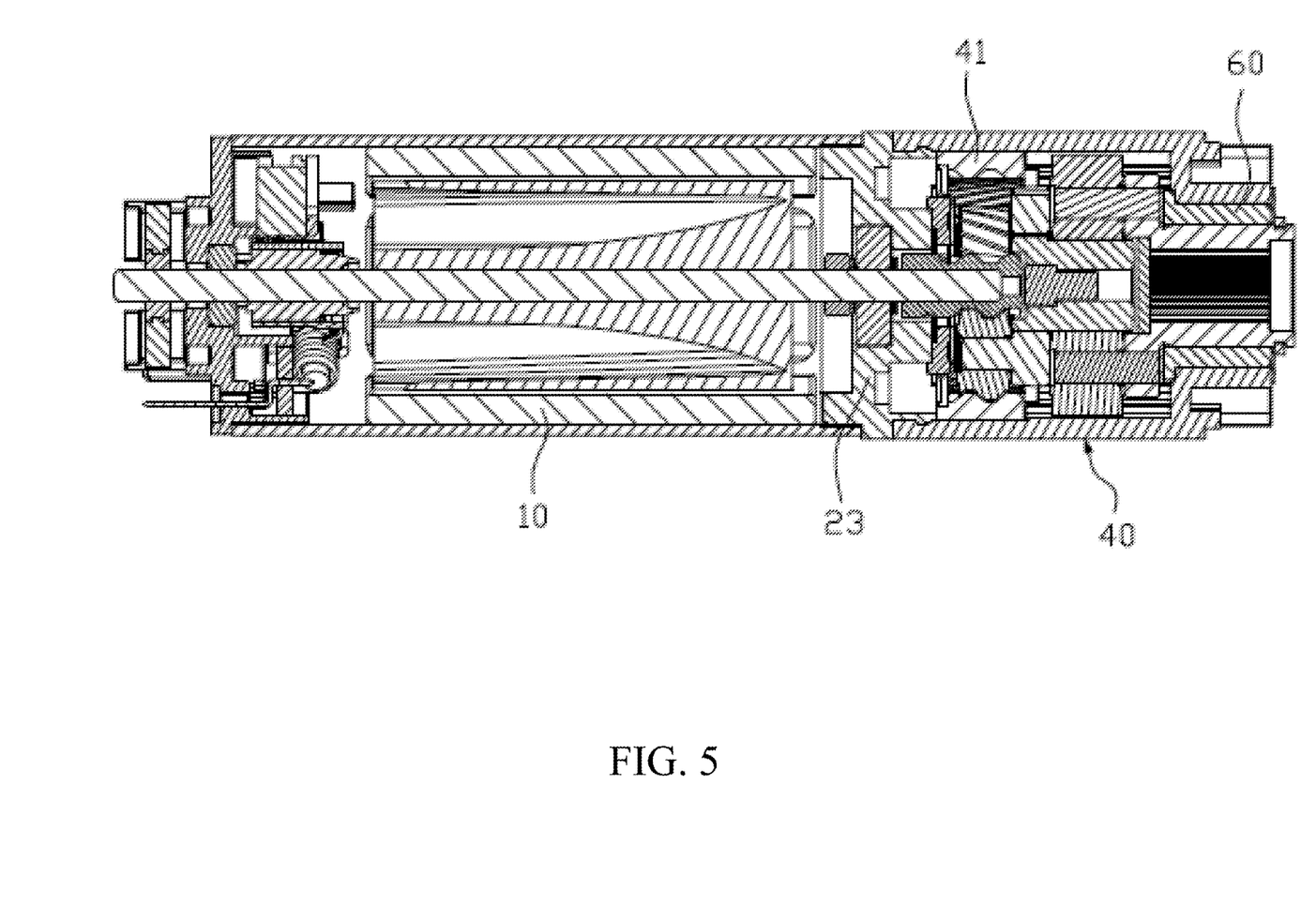
FIG. 5 is a cross section view of the driving device of FIG. 4.

FIG. 4 and FIG. 5 illustrate a driving device in accordance with a second embodiment of the present invention. The driving device of the second embodiment is similar to the driving device of the first embodiment except that in the second embodiment the ring gear 41 of the second stage planetary gear mechanism and the retainer 60 are integrally formed, the ring gear 41 of the first stage planetary gear mechanism is completely inserted into the ring gear 41 of the second stage planetary gear mechanism, and the ring gear 41 of the second stage planetary gear mechanism is connected to the first endcap 23 of the motor 10. In other embodiments, the ring gear 41 of the first stage planetary gear mechanism may be integrally formed with the ring gear 41 of the second stage planetary gear mechanism.

Figure 6:
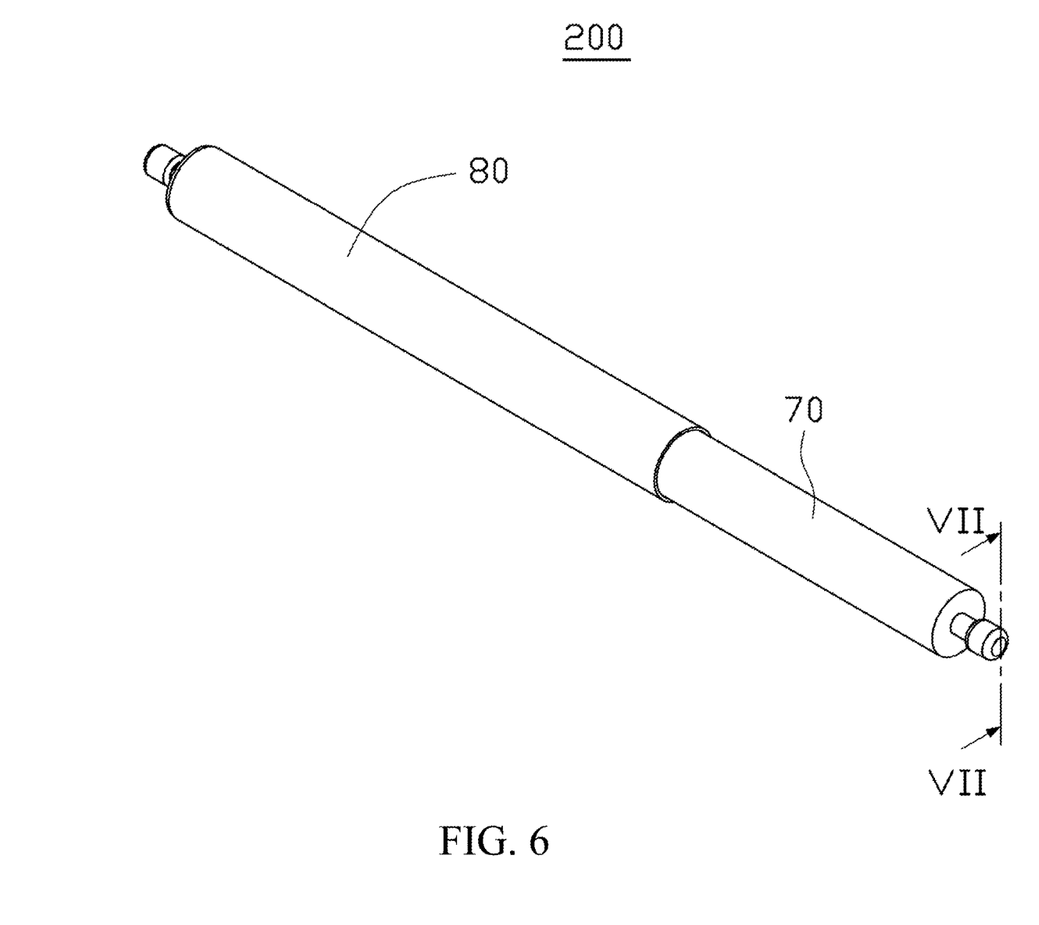
FIG. 6 illustrates a lifting device for a vehicle tailgate employing one of the above driving devices.
Figure 7:
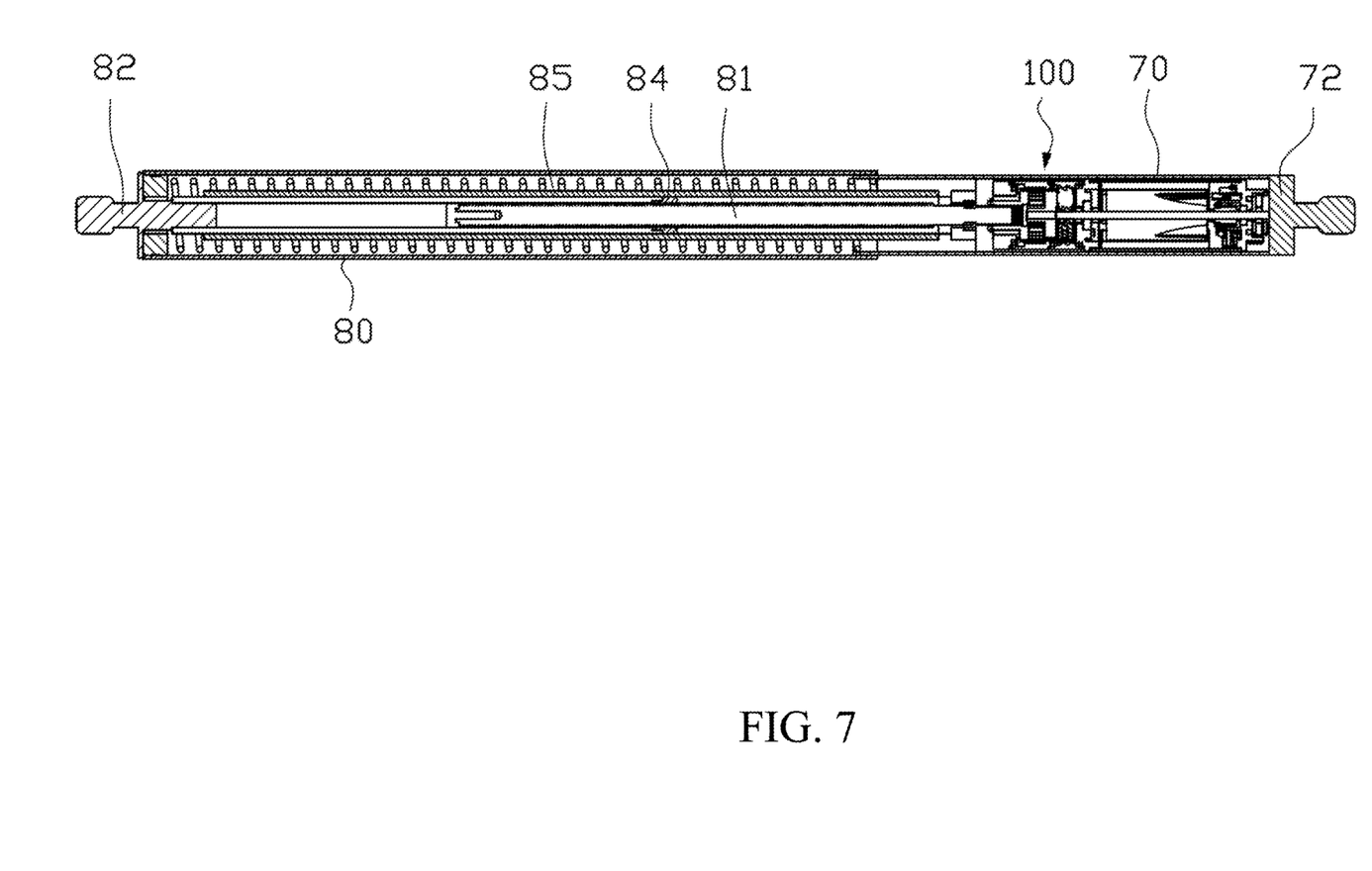
FIG. 7 is a cross section view of the lifting device of FIG. 6.

FIG. 6 and FIG. 7 illustrate an electric lifting device 200 for a vehicle tailgate using the driving device of the present invention. The lifting device 200 comprises a first sleeve 70 and a driving device 100 installed in the first sleeve 70, a second sleeve 80 and a lead screw 81 disposed in the second sleeve 80, and a first interface member 72 located at one end of the first sleeve 70 for connecting to a vehicle body, and a second interface member 82 located at one end of the second sleeve 80 for connecting to the vehicle tailgate. A spring 83 is received in the second sleeve 80, and a nut 84 is mounted around the lead screw 81. The lead screw 81 is driven by the gear train 40. The nut 84 mounted on the lead screw 81 is used for converting rotation of the lead screw 81 into linear movement of the nut 84. The nut 84 is fixed to the second interface member 82 via a connecting member 85.

In operation, the lead screw 81 is driven by the driving device 100. Then, the second interface member 82, the connecting member 85 and second sleeve 80 extend or retract relative to the first interface member 72, thus lifting or lowering the tailgate. One end of the spring 83 abuts against the second interface member 82, or alternatively abuts against an end wall of the connecting member 85 remote from the first interface member 72. The other end of the spring 83 abuts against an axial distal end of the first sleeve 70 remote from the first interface member 72. When the tailgate is closed, the spring 83 is in a compressed state. As the lead screw 81 drives the second interface member 82 to extend outward to lift the tailgate up, the recoil from the spring 83 provides a push force to the second interface member 82 to support some of the weight of the lift gate to reduce the load on the motor.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

The invention claimed is:

1. A driving device comprising:
    an electric motor comprising a stator and a rotor rotatable relative to the stator, the stator comprising a cylindrical housing and an endcap mounted to an end of the housing, the rotor comprising a rotating shaft, wherein a bearing is mounted to the endcap to rotatably support the rotating;
    a gear train comprising a gear mechanism with at least one stage which comprises a ring gear, a sun gear, planetary gears and a carrier;
    wherein the ring gear is directly engaged with the endcap which limits the position of the planetary gears of the gear train in an axial direction of the gear train.

2. The driving device of claim 1, wherein the ring gear is fastened to the endcap via locking pins, screws, interlocking structures or welding.

3. The driving device of claim 2, wherein the locking pin is formed by rolling a metal sheet.

4. The driving device of claim 1, wherein the housing defining an opening in the end thereof, the endcap covers the opening of the housing.

5. The driving device of claim 4, wherein the endcap extends into the housing via the opening, a plurality of protrusions forms at a circumferential surface of the endcap, the protrusions abuts against an inner surface of the housing of the stator.

6. The driving device of claim 4, wherein the housing of the stator is formed by rolling a metal sheet into a hollow column configuration.

7. The driving device of claim 6, wherein a plurality of permanent magnets is mounted at an inner surface of the housing and a joining area between two edges of the metal sheet faces a gap formed between adjacent two of the magnets.

8. The driving device of claim 4, wherein the endcap defines locking slots, and the housing of the stator forms locking parts respectively engaged in corresponding locking slots.

9. The driving device of claim 4, wherein one of the endcap and the housing of the electric motor forms positioning notches and the other forms positioning projections respectively received in corresponding positioning notches.

10. The driving device of claim 1, wherein the gear train comprises an output member which has a hollow configuration with teeth or keys formed at an inner surface thereof.

11. The driving device of claim 10, wherein the output member is connected with the carrier of the planetary gear mechanism.

12. The driving device of claim 10, further comprising a retainer connected with the ring gear of the at least one stage planetary gear mechanism, wherein the output member is rotatably received in the retainer.

13. The driving device of claim 12, wherein a locking ring is arranged at a distal end of the output member, the locking ring abutting against an end face of the retainer.

14. The driving device of claim 12, wherein the retainer is integrally formed with the ring gear.

15. The driving device of claim 1, wherein the planetary gear mechanism comprises a first stage planetary gear mechanism and a second stage planetary gear mechanism driven by the first stage planetary gear mechanism.

16. The driving device of claim 15, wherein the ring gear of the first stage planetary gear mechanism is received in the ring gear of the second stage planetary gear mechanism.

17. The A lifting device for a vehicle tailgate movably mounted to a vehicle body, comprising a first sleeve, a first interface member fixed to and at one end of the first sleeve and connected to the vehicle body, a second sleeve coaxially connected to first sleeve, a second interface member located at one end of the second sleeve away from the first interface member and connecting to the vehicle tailgate, and a driving device installed in the first sleeve and configure to drive the second interface member to move related to the first interface member, the driving device comprising:

an electric motor comprising a stator and a rotor rotatable relative to the stator, the stator comprising a cylindrical housing and an endcap mounted to an end of the housing, the rotor comprising a rotating shaft, wherein a bearing is mounted to the endcap to rotatably support the rotating; and a gear train comprising a gear mechanism with at least one stage which comprises a ring gear, a sun gear, planetary gears and a carrier;

wherein the ring gear is directly engaged with the endcap which limits the position of the planetary gears of the gear train in an axial direction of the gear train.

* * * * *